Patented Oct. 19, 1954

2,692,231

UNITED STATES PATENT OFFICE 2,692,231

MICROBIOCIDAL WATER TREATMENT

Richard D. Stayner, Albany, and Gordon B. Johnson, Berkeley, Calif., assignors to California Research Corporation, San Francisco, Calif., a corporation of Delaware No Drawing. Application September 5, 1950, Serial No. 183,281

5 Claims. (Cl. 210—23)

This invention relates to the treatment of water. More particularly, it is directed to providing improved means for controlling microbiological organisms including bacteria, fungi, algae, protozoa, and the like, present in water.

It is well known that ordinary water contains various bacteria, fungi, algae, protozoa and other microbiological organisms which, if uncontrolled, multiply under certain conditions so as to present many serious problems. For example, in swimming pools the growth of these microbiological organisms is very undesirable from a sanitary standpoint as well as for general appearances and maintenance. In industrial water systems such as cooling towers, condenser boxes, spray condensers, water tanks, basins, gravel water filters, and the like, algae and similar microbiological flora may interfere greatly with proper functioning of equipment and result in poor heat transfer, clogging of systems and rotting of wooden equipment, as well as many other costly and deleterious effects.

In other industrial applications where water is used in processes, as for example, as a carrying medium, etc., microbiological flora may also constitute a problem in maintenance and operation. Illustrative of such industrial applications are the pulp and paper manufacturing processes, oil well flooding operations, and the like.

In the wood pulp and paper industry control of microbiological organisms in water is especially important. White water containing wood pulp is unusually susceptible to the growth of slime and other types of microbiological flora. The term "white water" as hereinafter used is intended to designate water from various pulp and paper mill operations which do not load the water with impurities so as to prevent its reuse in the pulp and paper mill processes such as the sheet-forming operations. The reuse of this water causes a gradual build-up of microbiological flora over a period of time which eventually seriously interferes with normal operations. For example, when the wood pulp is suspended in water during the numerous processing steps necessary for the conversion to finished pulp and paper products, some of the microbiological flora ordinarily present is left intermixed with the processed pulp. On drying, this slime or microbiological flora may leave discoloration, holes, thin spots and/or accumulations of dirt in the product which not only ruin its general appearance, but also detract from its quality. In addition, the presence of this microbiological flora is the cause of operating difficulties in the drying procedures. Such difficulties are often manifested by breaking of the partially dried sheet on the drying rolls which results in lost time on the drying machines as well as the added expense of recovering the partially processed materials.

Among the various agents which have heretofore been used to control growth of microbiological organisms such as bacteria, fungi, algae, protozoa, and the like, are chlorine; organic and inorganic salts of copper and silver, such as the naphthenates and sulfates; organic mercurials, such as phenyl mercuric acetate; chlorinated phenolic compounds, such as sodium pentachlorphenate, etc.; as well as others. All of these agents have various disadvantages in different applications for water treatment that render them unsuitable for general use. For example, chlroine, if present in sufficient concentration to prevent growth, is inclined to be corrosive to equipment and irritating to the skin and eyes of persons exposed to the water. The various organic and inorganic salts are not always effective and are also unsatisfactory for many applications because of their high toxicity, corrosivity and irritating properties.

Also among the various agents which have been previously utilized in water treating and found to be inadequate under certain circumstances are quaternary ammonium salts, such as the alkyl dimethyl benzyl ammonium chlorides. Although these quaternaries are attractive from the standpoint of their low toxicity and corrosivity as well as ease of application, they are often ineffective and become deactivated by various deactivating materials encountered in water. For example, in pulp and paper mill white water which customarily contains large amounts of lignin and cellulosic materials, the quaternaries are found to be wholly ineffective at economic levels.

It is, accordingly, an object of this invention to provide new and improved methods for controlling the growth of microbiological organisms which are not subject to the disadvantages inherent in water treating agents which have been used heretofore.

Another object is the inhibition of algae and other slime-forming organisms in industrial water systems, swimming pools, and the like.

A still further object is to prevent the growth of microbiological organisms such as bacteria, fungi, algae, protozoa, and the like, in industrial process water containing contaminants which render the use of quaternaries unfeasible.

Another very important and particular object of this invention is the control of microbiological flora in pulp and paper mill white water.

Other objects will be apparent from the disclosure of the invention which hereinafter appears and from the appended claims.

We have discovered that microbicidal compositions comprising quaternary ammonium germicides and promoters of the type hereinafter described are highly effective agents for combating microbiological organisms such as bacteria, fungi, algae, protozoa, and the like, in water. Such compositions are not only extremely effective in water treatment, but also may be used without damage to equipment and injury or discomfort to persons coming into contact with the treated water. Furthermore, these compositions have been found to be unusually effective for the control of microbiological flora in waters contaminated by deactivating materials where quaternaries alone are relatively ineffective.

Our method of treating water with compositions comprising quaternary ammonium germicides and promoters is particularly effective in control of the growth of microbiological flora in pulp and paper mill water. The treatment provides both a very high killing or bactericidal action against the slime present in such water and a bacteriostatic effect which inhibits growth of additional microbiological organisms between treatments.

A wide variety of quaternary ammonium germicides which are generally known to the art may be used in the water treating compositions according to the process of our invention. Such compounds will be obvious to those skilled in the art from the disclosure which follows. Illustrative of the general class are the compounds characterized by the formula

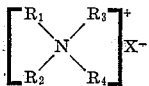

wherein at least one of the radicals $R_1$, $R_2$, $R_3$ and $R_4$ attached to the nitrogen atom is a hydrophobic aliphatic radical of from 6 to 26 carbon atoms. The hydrophobic aliphatic radicals may be long-chain alkyl, long-chain alkoxyaryl, long-chain alkylaryl, halogen substituted long-chain alkylaryl, long-chain alkylphenoxyalkyl, arylalkyl, etc. in nature. The remaining radicals on the nitrogen atom other than the hydrophobic aliphatic radicals are substituents of hydrocarbon structure containing a total of no more than 12 carbon atoms. The radical X in the above formula may be any salt-forming anionic radical. Various compounds of these types are more fully illustrated in the disclosure hereinafter. Mixtures of the quaternaries may be used as well as the single compounds.

Briefly stated, the promoters of the water treating compositions, according to our invention, may be any nonanionic organic materials having a limited solubility in water of less than about 5%. Such materials are preferably characterized by a high molecular weight hydrophobic group attached to a weakly hydrophilic radical. Desirably, the high molecular weight hydrophobic group is aliphatic, unsaturated aliphatic, cycloaliphatic, araliphatic or aliphaticaryl in nature and contains from about 8 to 18 carbon atoms. Among the weakly hydrophilic radicals which are characteristic of the more desirable promoters are radicals such as the hydroxyl and amino radicals.

The quaternary ammonium germicide and promoter compositions used in treating water according to our invention contain various proportions of quaternary and promoter, depending upon the nature of the quaternary and the promoter as hereinafter disclosed. Compositions comprising as their active ingredient a substantial amount of quaternary ammonium germicide and an amount of promoter sufficient to enhance the bactericidal effect of the quaternary and prevent its deactivation by contaminant are ordinarily used. The proportion of promoter ordinarily should not exceed about 80% by weight of the composition since amounts in excess of that usually dilute the solution to such an extent as to offset any enhancement of activity of the quaternary ammonium compounds. Preferably, the compositions of quaternary and promoter contain from about 30% to 90% by weight quaternary and from about 10% to 70% by weight promoter, while those containing from about 50% to 70% by weight quaternary and from about 30% to 50% by weight promoter are even more desirable in certain water treating applications requiring extraordinarily high microbicidal activity. The latter range, for example, is particularly effective in the treatment of pulp and paper mill water where it has been found that approximately equivalent amounts of quaternary ammonium germicide and promoter are most satisfactory.

In our method of treating water to control the growth of microbiological organisms such as bacteria, fungi, algae, protozoa, and the like, the quaternary ammonium germicide and promoter compositions are added to the water in amounts sufficient to control the microbiological organisms. Concentrations as low as about 1 p. p. m. may be used, although greater amounts may be required in certain applications, as for example, where high numbers of microbiological flora are encountered in the water being treated. Although we have found no critical upper limit for the concentration, amounts in excess of 500 p. p. m. for ordinary water treating are considered impractical due to higher cost. As a specific application we have found that in the control of pulp and paper mill slime, concentrations ranging from about 25 to about 250 p. p. m. are usually effective and from about 50 to 250 p. p. m. are preferred.

As quaternary compounds in the quaternary ammonium germicide and promoter water treating compositions, a wide variety of quaternary salts known to the art for their germicidal activity is ordinarily satisfactory. Illustrative of such quaternary ammonium compounds are the alkyl ammonium halides such as cetyl trimethyl ammonium bromide, octadecyl dimethyl ethyl ammonium bromide, octadecenyl dimethyl ethyl ammonium bromide, dioctadecyl dimethyl ammonium chloride, etc. Other related quaternary ammonium salts are the alkylaryl ammonium halides such as long-chain alkyl dimethyl benzyl ammonium chlorides in general, including octadecyl dimethyl benzyl ammonium bromide; alkyl dimethyl dichlorobenzyl ammonium chloride, lauryl dimethyl benzyl ammonium chloride, and the like. N-alkylpyridinium halides as illustrated by N-cetylpyridinium bromide, N-laurylpyridinium chloride, myrstyl γ picolinium chloride, etc. are suitable. Another type of quaternary ammonium salt which is contemplated is that wherein the molecule contains an ether linkage, as exemplified by compounds such as paratertiary octylphenoxyethoxyethyl dimethyl benzyl ammonium chloride, and the like. The quaternary ammonium salts having oxygen in the form of amide or ester linkages such as N-(laurylcolaminoformylmethyl)-pyridinium chloride, N-(myrstylcolaminoformylmethyl)-p y r i d i n i u m chloride, and the like are also contemplated. Still other satisfactory types of quaternary ammonium compounds are those containing a sulfonamide group such as 2-phenyl-3-p-sulfamidophenyl-5-undecyltetrazolium chloride, 4-sulfanilamido-benzyl tetradecyl dimethyl ammonium bromide, 4-dodecylsulfanilamidopyridinium bromide, etc. Another type of very effective quaternary ammonium germicide is that characterized by a substituted aromatic nucleus as in the case of lauryloxyphenyl trimethyl ammonium chloride, cetylaminophenyl trimethyl ammonium methosulfate, dodecylphenyl trimethyl ammonium methosulfate, dodecylbenzyl trimethyl ammonium chloride, chlorinated dodecylbenzyl trimethyl ammonium chloride, lauryl dimethyl chlorobenzyl ammonium chloride, cetyl dimethyl nitrobenzyl ammonium chloride, and the like. Yet another type of satisfactory quaternary ammonium compound is that represented by the morpholinium quaternaries such as the N-dodecyl-N-methyl morpholinium methosulfates and halides.

Although any of the above types of quaternary ammonium germicides are ordinarily satisfactory in the quaternary and promoter compositions utilized in our method of treating water, certain of the compounds such as the long-chain alkyl dimethyl benzyl quaternary ammonium salts, the alkylphenoxyalkoxyalkyl dimethyl benzyl quaternary ammonium salts, the N-(acylcolaminoformylmethyl)-pyridinium halides, the long-chain alkyl trimethyl ammonium halides, as well as the long-chain alkylbenzyl trimethyl ammonium chlorides in which the alkyl radical contains from 8 to 18 carbon atoms, are particularly satisfactory. Such compounds are not only highly effective when used in the quaternary and promoter water treating compositions, but are readily available in good quantities. Of these more satisfactory quaternaries, those compounds of the long-chain alkylbenzyl trimethyl ammonium halide type are preferred in the most stringent water treating applications. This latter group of compounds, as illustrated by dodecylbenzyl trimethyl ammonium chloride and dodecylmethylbenzyl trimethyl ammonium chloride, is especially satisfactory in the treatment of microbiological flora in pulp and paper mill water.

As promoter for the water treating quaternary ammonium germicide compositions the more suitable types of hydrophobic-weakly hydrophilic compounds are, for example, long-chain aliphatic amines, long-chain aliphatic alcohols, cycloaliphatic alcohols, alkylcyclohexanols, alkylphenylglycol ethers, alkylphenylpolyglycol ethers, aroylglycol ethers, and the like. More specific examples of the preceding types of promoters which are very effective are lauryl alcohol, cetyl amine, dodecyl aniline, terpineol, dodecylcyclohexanol, pine oil, tetradecylphenylmonoethyleneglycol ether, octylphenylmonoalkyleneglycol ether and octylphenyldiethyleneglycol ether. Although some of these compounds are mildly germicidal of themselves, their primary function in the quaternary compositions is as activation agents to enhance the microbicidal effect of the quaternary ammonium germicides utilized in the compositions. Of the foregoing illustrative promoters, pine oil, octylphenylethyleneglycol ether and octylphenyldiethyleneglycol ether are the more satisfactory ones.

Additional promoters are the long-chain alkyl-aromatic hydrocarbons, such as dodecylbenzene, dodecyltoluene, nonylnaphthalene and the like. Esters, such as the class of aliphatic esters illustrated by ethylacetate, etc., may also be used as promoters in the water treating compositions used according to this invention.

In a typical example of our invention the quaternary ammonium germicide and quaternary ammonium germicide promoter composition is added by suitable means to the water to be treated in amounts sufficient to control the growth of the microbiological organisms present. These amounts will vary depending on the type of organism encountered as well as the strength or concentration in which it is present in the water. The proper proportions of the quaternary and promoter composition necessary for a particular application can be conveniently determined by taking control samples of the untreated water and testing them according to known laboratory procedures. Such procedures usually involve adding various proportions of the treating composition to a number of identical samples. Subsequent observation of these samples shows the proportions at which the desired decrease in bacteria count, etc., is obtained. From these determinations the correct amounts of quaternary and promoter composition can be calculated and added to the water system by suitable mechanical means such as injection pumps, proportionometers, etc., or manually if desired. The treatment operations may be carried out at intermittent intervals or may be performed continuously, depending on the type of water system being treated. "Shock treatments" such as those performed at intermittent intervals are highly satisfactory and may be preferred to avoid expensive equipment such as injection pumps and proportionometers. Control samples taken from the water system subsequent to treatment indicate the extent to which the treatment has been effective and whether or not further treatment is necessary. The addition of the quaternary ammonium germicide and quaternary ammonium germicide promoter composition is ordinarily made at any point in the system where the growth of microbiological organisms constitutes a problem. However, under some circumstances it may be desirable to maintain the treatment throughout the entire water system.

In a particularly stringent application as illustrated in the treatment of pulp and paper mill water, the great superiority of our method of controlling growth of microbiological flora in water is most apparent. In pulp and paper mill operations, a "white water" solution, as it is referred to in the industry and defined heretofore, is used in the processing of the wood. The processes are usually carried out at temperatures ranging from room temperature, or about 60° F., to as high as about 130° F. or more. Under these conditions the growth of bacteria to form a microbiological type of slime is favored and usually results in the loss of fiber, decay of pulp, obnoxious odors, etc., during processing, as well as a final product of inferior quality. In many instances the slime-producing organisms may operate so as to cause excessive operating expense due to lost time for cleaning, etc.

In a treatment according to the process of our invention, a quaternary ammonium germicide and quaternary ammonium germicide composition consisting of equivalent amounts by weight of dodecylbenzyl trimethyl ammonium chloride and pine oil was added to paper mill "white water" in concentrations of 25, 50 and 100 p. p. m. For the purpose of comparison, quaternaries including dodecylbenzyl trimethyl ammonium chloride, chlorinated dodecylbenzyl trimethyl ammonium chloride containing an average of 5 chlorine atoms in the alkyl radical, and dodecylphenyl trimethyl ammonium methosulfate were likewise tested by adding them in similar proportions to "white water." Sodium pentachlorphenate, a bactericide commonly used in combating slime in paper mill water, was also tested under like circumstances to show the comparative effect of chemicals other than quaternary ammonium germicides. The results of these tests in control of microbiological flora, as indicated from the amount of bacteria present in the water at various periods, is set out in Table I below.

TABLE I

*Bacteria counts on paper mill white water containing control reagents*

| Chemical Tested | Conc. of quat. in p. p. m. | Bacteria Count | | |
|---|---|---|---|---|
| | | 2 hrs. | 24 hrs. | 48 hrs. |
| Dodecylbenzyl trimethyl ammonium chloride | 0 | 6,500,000 | 4,320,000 | 3,920,000 |
| | 25 | 6,820,000 | 4,330,000 | 4,120,000 |
| | 50 | 6,530,000 | 4,320,000 | 4,080,000 |
| | 100 | 66,000 | 318,000 | 670,000 |
| Dodecylbenzyl trimethyl ammonium chloride plus pine oil in equal parts by weight | 0 | 6,500,000 | 4,320,000 | 3,920,000 |
| | 25 | 6,100,000 | 3,100,000 | 3,000,000 |
| | 50 | 848,000 | 210,000 | 158,000 |
| | 100 | 0 | 0 | 0 |
| Pentachlorododecylbenzyl trimethyl ammonium chloride | 0 | 6,500,000 | 4,320,000 | 3,920,000 |
| | 25 | 6,900,000 | 6,700,000 | 6,400,000 |
| | 50 | 6,400,000 | 6,800,000 | 6,600,000 |
| | 100 | 6,500,000 | 6,700,000 | 6,300,000 |
| Dodecylphenyl trimethyl ammonium methosulfate | 0 | 6,500,000 | 4,320,000 | 3,920,000 |
| | 25 | 6,500,000 | 6,700,000 | 6,900,000 |
| | 50 | 6,700,000 | 6,500,000 | 6,800,000 |
| | 100 | 6,600,000 | 6,700,000 | 6,500,000 |
| Sodium pentachlorphenate | 0 | 6,500,000 | 4,320,000 | 3,920,000 |
| | 25 | 2,330,000 | 2,410,000 | 2,950,000 |
| | 50 | 138,000 | 138,000 | 115,000 |
| | 100 | 19,200 | 12,000 | 9,800 |

In the above table the bacteria counts were obtained by adding the various chemicals tested to paper machine "white water." Samples of the "white water" and the slime-inhibiting agent were withdrawn after intervals of 2, 24 and 48 hours. These samples were then plated on a mixture of nutrient sabourauds and agar and the plates incubated at 98° F. for a period of 48 hours. Following the incubation period the bacteria were counted.

In summarizing the results contained in Table I above, it is seen that the quaternary ammonium germicides of themselves had little or no bactericidal effect at the concentrations tested. The dodecyl benzyl trimethyl ammonium chloride which was the only compound to display any bactericidal properties gave an increasing count at 24 hours and 48 hours, indicating the absence of bacteriostatic action. The sodium pentachlorophenate failed to give a complete kill even at the larger concentrations. In contrast to the preceding composition, the dodecyl benzyl trimethyl ammonium chloride and pine oil germicidal composition gave a complete kill; and at the more dilute concentrations, a definite bacteriostatic effect was noted.

In addition to the above tests on the effectiveness of the various slime-inhibiting agents as determined from bacteria counts obtained on samples of treated paper mill white water, further tests were performed to evaluate the relative fungicidal charatceristics of the representative compositions. The results of these tests are set out in Table II below.

TABLE II

*Yeast and mold counts on paper mill water containing control reagents*

| Chemical Tested | Conc. of quat. in p. p. m. | Yeast and Mold Count | | |
|---|---|---|---|---|
| | | 2 hrs. | 24 hrs. | 48 hrs. |
| Dodecylbenzyl trimethyl ammonium chloride | 0 | 349 | 357 | 399 |
| | 25 | 371 | 329 | 353 |
| | 50 | 381 | 371 | 345 |
| | 100 | 367 | 352 | 318 |
| Dodecylbenzyl trimethyl ammonium chloride plus pine oil in equal parts by weight | 0 | 349 | 357 | 399 |
| | 25 | 317 | 351 | 338 |
| | 50 | 281 | 372 | 388 |
| | 100 | 0 | 0 | 0 |
| Pentachlorododecylbenzyl trimethyl ammonium chloride | 0 | 349 | 357 | 399 |
| | 25 | 315 | 371 | 352 |
| | 50 | 365 | 411 | 371 |
| | 100 | 343 | 416 | 381 |
| Dodecylphenyl trimethyl ammonium methosulfate | 0 | 349 | 357 | 399 |
| | 25 | 354 | 382 | 314 |
| | 50 | 417 | 420 | 385 |
| | 100 | 310 | 319 | 382 |
| Sodium pentachlorphenate | 0 | 349 | 357 | 399 |
| | 25 | 295 | 381 | 362 |
| | 50 | 381 | 316 | 382 |
| | 100 | 1 | 295 | 372 |

The results in Table II above were obtained by making yeast and mold counts on paper mill "white water" which had been treated with various proportions of the slime-inhibiting agents being tested. Samples were withdrawn from the "white water" at intervals of 2, 24, and 48 hours following the treatment. These samples were plated on malt agar to which one drop of a 25% lactic acid solution had been added to retard bacterial growth. The plates were incubated at 75° F. and a count of the yeast and mold made after a period of 48 hours.

From the results of Table II, it is readily seen that the slime-inihibiting composition containing dodecylbenzyl trimethyl ammonium chloride and pine oil was the only one having any noticeable fungicidal effect at the concentrations tested. These tests relating to the fungicidal activity which is obtained when water is treated according to the method of our invention clearly demonstrate the superiority of our invention over other processes. Spore-forming microorganisms encountered in paper mill water slime, although not affected by other compositions tested, were easily killed by the method of our invention.

In the treatment of water, according to our invention, additional materials along with the quaternary ammonium germicide and quaternary ammonium germicide promoter may be introduced into the water system. In some instances it may be desirable to use a dispersing agent. Nonionic surface-active compounds such as the alkylphenylpolyglycol ethers and the like are suitable for this purpose. If desired, water-soluble dyes and odor-masking agents may also be used.

Although the foregoing description and examples are illustrative of our invention in the treatment of water, many obvious variations and modifications of the invention will be apparent from this disclosure to persons skilled in the art. All such variations and modifications as come within the scope of the following claims are included in this invention.

We claim:
1. A method of treating paper mill white water containing microbiological organisms which com- prises adding to said water from about 50 to about 250 p. p. m. of a composition consisting essentially of from about 30% to 90% by weight of a long-chain alkylbenzyl trimethyl ammonium halide having from 6 to 26 carbon atoms in the long-chain alkyl group and from about 10% to 70% by weight of a nonanionic organic material having a solubility in water of less than about 5% and being characterized by a high molecular weight hydrophobic group selected from the group consisting of pine oil, octylphenylethyleneglycol ether, and octylphenyldiethyleneglycol ether.

2. A method of treating water as defined in claim 1 wherein the water-treating composition consists essentially of from about 50 to 70 per cent, by weight, of a long-chain alkylbenzyl trimethyl ammonium chloride and from about 30 to 50 per cent, by weight, of octylphenylethyleneglycol ether.

3. A method of treating water as defined in claim 1 wherein the water-treating composition consists essentially of from about 50 to 70 per cent, by weight, of a long-chain alkylbenzyl trimethyl ammonium halide and from about 30 to 50 per cent, by weight, of octylphenyldiethyleneglycol ether.

4. A method of treating paper mill white water containing microbiological flora which comprises adding to said paper mill water from about 50 to about 250 p. p. m. of a composition comprising 30% to 90% by weight dodecylbenzyl trimethyl ammonium chloride and 10% to 70% by weight pine oil.

5. A method of treating paper mill white water containing microbiological organisms which comprises adding to said water from about 50 to about 250 p. p. m. of a composition consisting essentially of from about 50% to 70% by weight of a long-chain alkylbenzyl trimethyl ammonium halide having from 6 to 26 carbon atoms in the long-chain alkyl group and from about 30% to 50% by weight of pine oil.

References Cited in the file of this patent

UNITED STATES PATENTS

| Number | Name | Date |
|---|---|---|
| 2,086,585 | Traub et al. | July 13, 1937 |
| 2,087,131 | Traub et al. | July 13, 1937 |
| 2,191,922 | Bruson | Feb. 27, 1940 |
| 2,252,863 | Raymond | Aug. 19, 1941 |
| 2,261,002 | Ritter | Oct. 28, 1941 |
| 2,375,853 | Kirby et al. | May 15, 1945 |
| 2,380,877 | Shelton | July 31, 1945 |
| 2,393,293 | Corley | Jan. 22, 1946 |
| 2,446,793 | Shelton et al. | Aug. 10, 1948 |
| 2,446,796 | Van Campen et al. | Aug. 10, 1948 |
| 2,576,474 | Langmeir | Nov. 27, 1951 |
| 2,577,773 | Lambert | Dec. 11, 1951 |
| 2,580,473 | Sowa et al. | Jan. 1, 1952 |
| 2,666,009 | Stayner | Jan. 12, 1954 |
| 2,666,010 | Stayner | Jan. 12, 1954 |

OTHER REFERENCES

Paper Trade J., Tappi Sec., pp. 143–54, May 29, 1947.

Hopper, J. Am. Water Works Assn., vol. 37, p. 302, March 1945.